(12) United States Patent
Cotta et al.

(10) Patent No.: US 11,052,795 B2
(45) Date of Patent: Jul. 6, 2021

(54) MOTOR VEHICLE REAR SEAT BACKREST PROVIDED WITH A STIFFENING PLATE

(71) Applicant: PSA AUTOMOBILES SA, Poissy (FR)

(72) Inventors: Gerald Cotta, Villepreux (FR); Karen Thomas, Villebon sur Yvette (FR); Frederic Pinto Teixeira, Ballainvilliers (FR)

(73) Assignee: PSA AUTOMOBILES SA, Poissy (FR)

( * ) Notice: Subject to any disclaimer, the term of this patent is extended or adjusted under 35 U.S.C. 154(b) by 149 days.

(21) Appl. No.: 16/476,496

(22) PCT Filed: Dec. 21, 2017

(86) PCT No.: PCT/FR2017/053756
§ 371 (c)(1),
(2) Date: Jul. 8, 2019

(87) PCT Pub. No.: WO2018/130755
PCT Pub. Date: Jul. 19, 2018

(65) Prior Publication Data
US 2021/0114491 A1 Apr. 22, 2021

(30) Foreign Application Priority Data
Jan. 12, 2017 (FR) ...................................... 1750254

(51) Int. Cl.
*B60N 2/36* (2006.01)
*B60N 2/30* (2006.01)
(Continued)

(52) U.S. Cl.
CPC ........... *B60N 2/366* (2013.01); *B60N 2/3013* (2013.01); *B60N 2/6009* (2013.01); *B60N 2/682* (2013.01); *B60N 2205/35* (2013.01)

(58) Field of Classification Search
CPC . B60N 2/366; B60N 2/32; B60N 2/36; B60N 2/3013; B60N 2/3002;
(Continued)

(56) References Cited

U.S. PATENT DOCUMENTS 5,295,732 A * 3/1994 Boisset .................... B60N 2/70
297/188.04
5,570,931 A * 11/1996 Kargilis ................. B60N 2/206
248/429

(Continued)

FOREIGN PATENT DOCUMENTS

FR 3016835 A1 7/2015
JP H08256874 A 10/1996

OTHER PUBLICATIONS

International Search Report for PCT/FR2017/053756 dated Apr. 16, 2018.
Written Opinion for PCT/FR2017/053756 dated Apr. 16, 2018.

*Primary Examiner* — Mark R Wendell
(74) *Attorney, Agent, or Firm* — Sandberg Phoenix & von Gontard, P.C.

(57) ABSTRACT

The present invention concerns a motor vehicle rear seat backrest suitable for being mounted in such a way that it can pivot on the structure of said vehicle between a raised position and a substantially horizontal stowed position, said backrest comprising a reinforcement (30) comprising a metal frame (32) and an array of metal wires (33) extending between the two uprights and between the two crossmembers of said frame (32), and a padding (40) supported by the front part of said reinforcement (30) and a cover (50) externally covering said reinforcement (30) and said padding (40); further comprising a stiffening plate (60) held via holding means (54; 55) against the inner face of the back (52) of said cover (50) and bearing against the rear part of said reinforcement (30).

16 Claims, 2 Drawing Sheets

(51) Int. Cl.
*B60N 2/68* (2006.01)
*B60N 2/60* (2006.01)

(58) Field of Classification Search
CPC ...... B60N 2/3009; B60N 2/6009; B60N 2/60; B60N 2/682; B60N 2205/35
USPC .... 297/378.13, 463.1, 452.1, 452.13, 452.14
See application file for complete search history.

(56) References Cited

U.S. PATENT DOCUMENTS

| | | | |
|---|---|---|---|
| 9,067,519 B2* | 6/2015 | Kajihara | B60N 2/5825 |
| 2003/0052527 A1* | 3/2003 | Naumovski | B23K 26/242 |
| | | | 297/452.56 |
| 2008/0118740 A1* | 5/2008 | Kuwahara | B32B 27/06 |
| | | | 428/327 |
| 2012/0319448 A1 | 12/2012 | Minetka et al. | |
| 2014/0042792 A1 | 2/2014 | Kajiwara | |

* cited by examiner

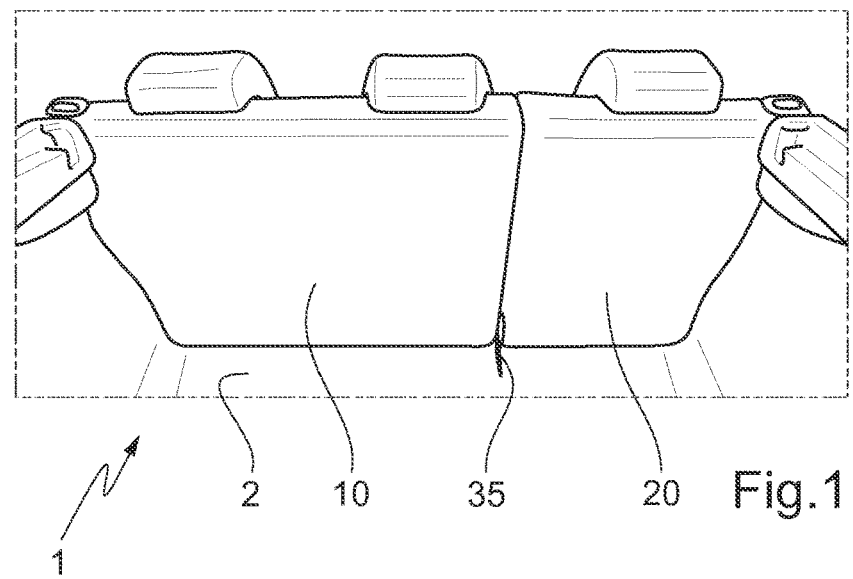
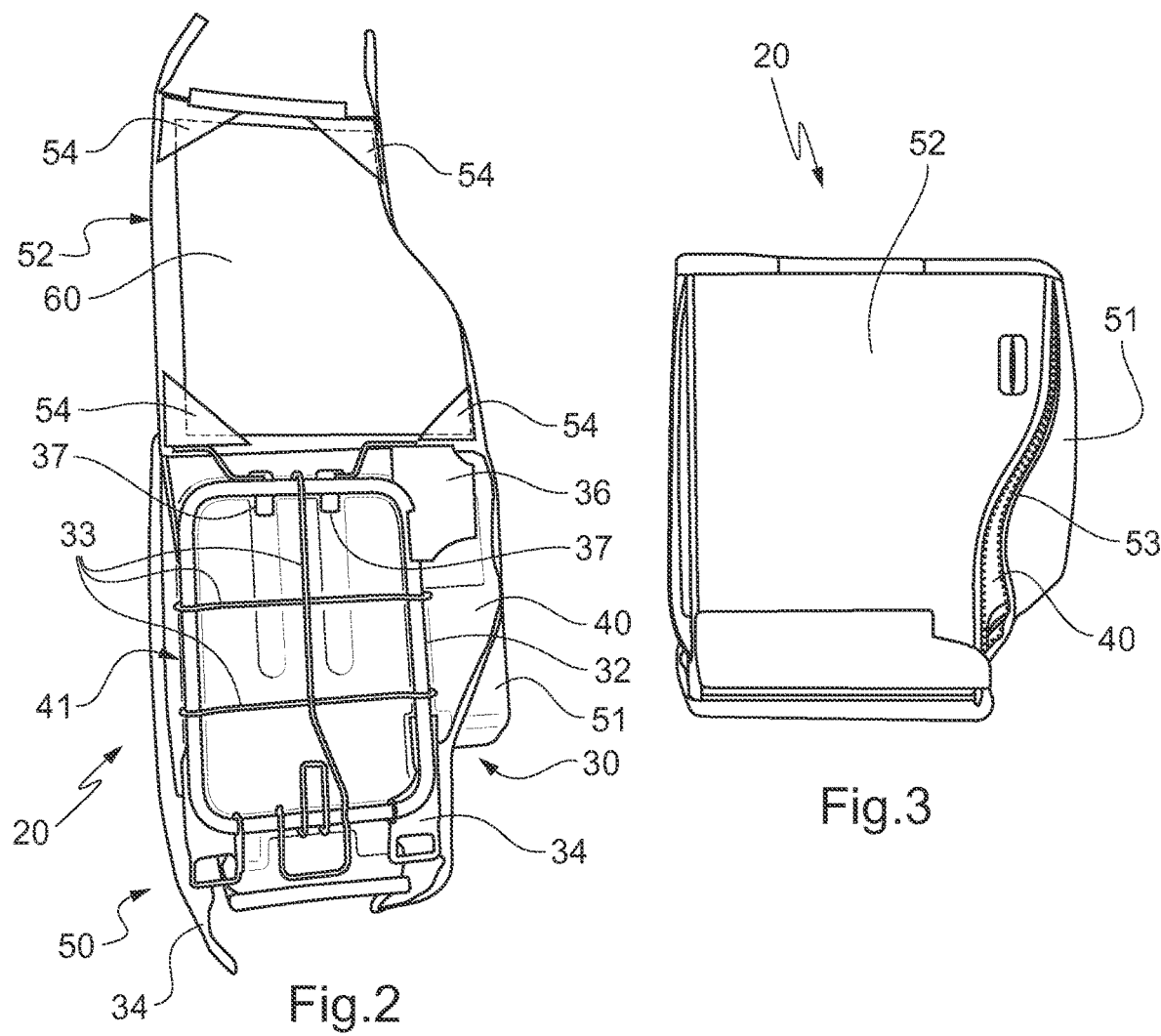

MOTOR VEHICLE REAR SEAT BACKREST PROVIDED WITH A STIFFENING PLATE

CROSS-REFERENCE TO RELATED APPLICATIONS

This application is the US National Stage under 35 USC § 371 of International Application No. PCT/FR2017/053756, filed 21 Dec. 2017 which claims priority to French Application No. 1750254 filed 12 Jan. 2017, both of which are incorporated herein by reference.

FIELD OF THE INVENTION

The present invention generally relates to motor vehicle rear bench-seats.

More specifically, it relates to a seatback for such a rear bench-seat.

BACKGROUND OF THE INVENTION

Motor vehicles are generally equipped in the rear portion of their cabin with a rear bench-seat comprising one or more seatbacks mounted with pivoting connections to the structure of the vehicle about an axle arranged along the transverse direction of this vehicle between a raised position, slightly inclined backward from the vertical, and a substantially horizontal folded-down position with which to increase the volume of the cargo compartment.

Each seatback conventionally comprises a framework whose front surface supports padding that is generally of foam and intended to provide postural comfort for the occupant.

The framework and padding are covered on the outside with upholstery or a cover of textile material, leather or imitation leather depending on the desired result.

A first type of rear seatback framework is known comprising a sheet metal panel obtained by stamping and a stiff metal frame fixed on the inner periphery of the sheet metal.

This type of framework, however, has a significant mass and a high production cost, in particular because of the production process by stamping of the sheet metal plate.

In order to limit the mass and reduce the production costs without however reducing the comfort or safety of the occupants, other types of seatback frameworks have been developed in recent years.

It is known, in particular from the French patent application FR 3016835, to make such a seatback framework from a stiff metal frame and a grid of vertical and horizontal steel wires extending between the two risers and two cross pieces of this frame.

When the seatback is configured in the horizontal folded down configuration for increasing the loading volume of the vehicle and when the user puts a heavy load supported at least partially by the seatback, the metal wires in the framework thereof tend to deform under the weight of this load.

Although temporary (the metal wires return to the initial shape thereof when the load is withdrawn), this phenomenon of deformation of the seatback has a negative impact on the quality level perceived by that user.

SUMMARY OF THE INVENTION

The aim is therefore to propose a rear bench-seat seatback which is economical to manufacture and does not deform or deforms only slightly under the effect of significant loads when it is in the folded down configuration thereof.

For this purpose, a motor vehicle rear bench-seat seatback is disclosed which is mountable with pivoting connections to the structure of the vehicle between a raised position and a substantially horizontal folded down position, where the seatback comprises a framework comprising a metal frame and a grid of metal wires extending between the two risers and the two cross pieces of the frame, and also padding supported by the front part of the frame and a cover covering the frame and the padding on the outside;

wherein the seatback further comprises a stiffening plate held via holding means against the inner surface of the back of the cover and coming to rest against the rear part of the frame.

The stiffness of the rear part of the seatback can be substantially improved with the presence of such a plate inserted between the back of the cover and the framework, such that the seatback does not deform (or deforms only slightly) when it is subject to significant loads in the horizontal folded down configuration thereof.

Further, since this plate is not directly attached to the metal framework, it can be made of any kind of light and economical material which has sufficient stiffness.

According to preferred characteristics of the seatback according to the invention:
- the holding means comprises four triangular pockets sewn into the four ends of the inner surface of the back of the cover and into which the four corners of the stiffening plate are inserted;
- the holding means comprises one single sewn pocket on the periphery of the inner surface of the back of the cover and completely covering the stiffening plate;
- the stiffening plate is made of plastic, cardboard or wood-based composite material;
- the stiffening plate is made of a cellular plastic;
- the stiffening plate is made of a polypropylene based cellular plastic such as AKILUX®;
- the stiffening plate has a thickness included between 2.5 and 6 mm; and/or
- the ends of the metal wires making up the frame are welded on the rear surface of the frame, the stiffening plate coming to rest against the wires.

In a second aspect, the aim is the provision of a motor vehicle rear bench-seat comprising at least two of such seatbacks arranged side-by-side in the direction of the width of the vehicle.

BRIEF DESCRIPTION OF THE DRAWINGS

The disclosure of the invention will now continue with the detailed description of an embodiment, given below for illustration and without limitation, with reference to the attached drawings, in which:

FIG. 1 shows a perspective back view of two seatbacks forming the rear bench-seat of a motor vehicle;

FIG. 2 is a view from above of one of the two seatbacks of the bench-seat from FIG. 1 shown before folding down and closure of the back of the cover on the front part thereof;

FIG. 3 shows a top view of the seatback from FIG. 2 after folding of the back of the cover onto the front part thereof and before closure thereof.

DETAILED DESCRIPTION OF A PREFERRED EMBODIMENT

Figure 4:
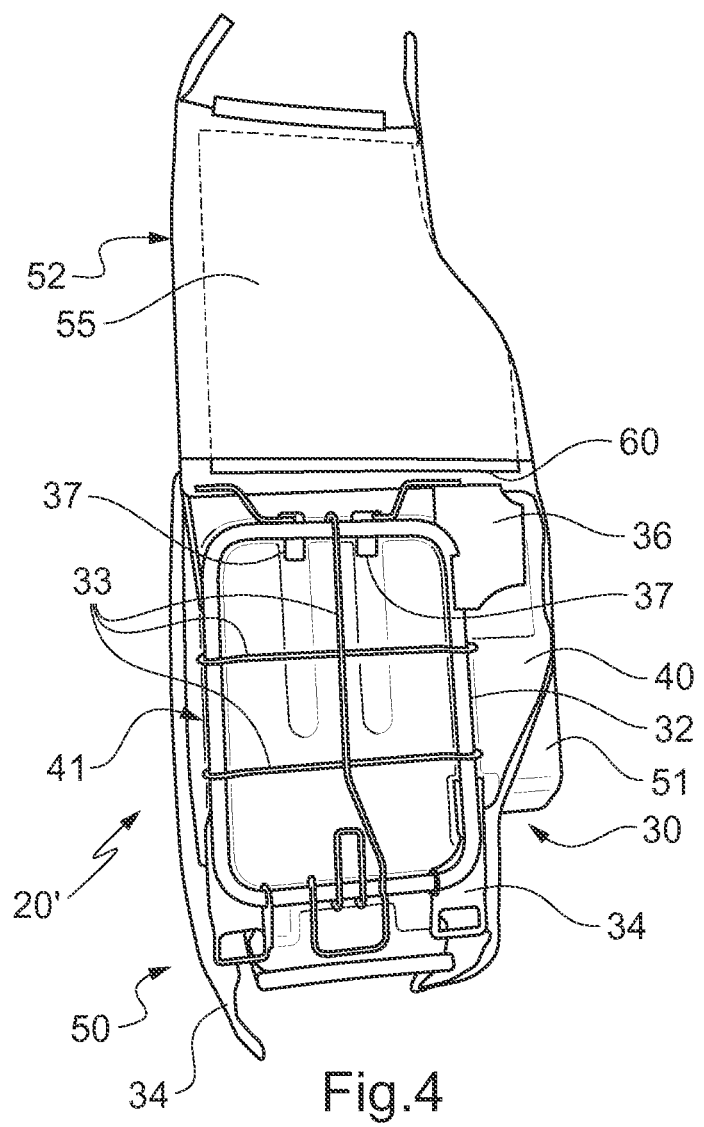
FIG. 4 is a view, similar to FIG. 2, of an alternative bench-seat seatback.

In the remainder of this description and by convention, the terms "front," "rear," "left," "right," "longitudinal" and "transverse" are defined relative to the assembled position of a motor vehicle rear bench-seat seatback in this vehicle compartment.

FIG. 1 shows a motor vehicle rear bench-seat 1, for example of rank two, mounted on the floor 2 of this vehicle.

The bench-seat 1 comprises two seatbacks 10, 20 arranged side-by-side in the direction of the width of the vehicle and having different sizes: the first seatback 10 able to receive up to two passengers represents about 60% of the total width of the bench-seat frame, whereas the second seatback 20 intended to receive the back of just one passenger represents about 40% of the same width.

The two seatbacks 10, 20 are mounted, independently of each other, with pivoting connections to the structure of the vehicle about a single transverse axle.

Each seatback 10, 20 is thus pivotable between a raised position in which it is slightly inclined backward from the vertical, as shown in FIG. 1, and a substantially horizontal folded-down position with which to increase the volume of the cargo compartment.

The seatback 20 will now be described in more detail with the support of FIGS. 2 and 3 with it understood that the seatback 10 has a similar design.

The seatback 20 comprises a lightweight stiff frame 30 whose front surface supports a flexible padding 40 intended to provide homogeneous and comfortable support for the back of the occupant.

The framework 30 and padding 40 are covered on the outside with a cover 50 of textile material, leather or imitation leather depending on the desired result.

The framework 30 comprises a stiff rectangular frame 32 formed by a folded metal tube whose free ends are welded to each other, and also a grid of steel wires 33 extending between the risers and between the cross pieces of this frame 32 (the ends of these wires are welded on the rear surfaces of these cross pieces and risers).

The framework 30 also comprises two pivoting bases 34 attached near the two lower corners of the frame 32 and mounted with pivoting connections around a transverse axle with two yokes 35 rigidly fixed respectively to the vehicle floor and structure (with only one of them visible in FIG. 1).

This framework 30 further comprises an anchoring device 36 attached to the upper part of the outer riser of the frame 32 and intended to engage with complementary means arranged on a corresponding lateral wall of the structure of the vehicle for locking the seatback 20 in the raised position thereof.

This anchoring device 36 may comprise for example a catch or cleat engaging with a strike-plate firmly connected to the structure.

The framework 30 finally comprises two vertical metal tubes 37 welded onto the front surface of the upper riser of the frame 32 and intended to slidably receive the two parallel rods of the headrest, not shown.

The padding 40, obtained from a flexible open cell melamine or polyurethane foam by molding, has an imprint 41 on the rear surface thereof with a shape corresponding to the framework 30 which is partially received therein.

The imprint 41 extends vertically downward from the areas receiving the two metal tubes 37 such that the padding 40 does not interfere with the headset rods during sliding thereof.

The cover 50 comprises a convex front part 51 matching the shape of the front surface and lateral surfaces of the padding 40 that it envelops.

This cover 50 also comprises a flat back 52 connected to the front part 51 by the lower edge thereof and whose lateral edges are attached to the lateral portions of this front part 51 by means of a sliding closure 53 (FIG. 3).

As is visible in FIG. 2, the seatback 20 further comprises a stiffening plate 60 covering the inner surface of the back 52 of the cover 50 and formed of a light and economical material such as plastic, cardboard or wood-based composite.

Preferably, the plate 60 is obtained by laser cutting or punching from a panel made of a polypropylene based cellular plastic such as AKILUX® from Kaysersberg Packaging.

This plate 60, which advantageously has a thickness included between 2.5 and 6 mm, extends over the entirety of the surface of the back 52 while being held against the inner surface thereof via four triangular pockets 54 of sewn nonwoven textile at the four ends of the inner surface of the back 52 and in which the four corners of the plate 60 are inserted.

In raised configuration of the seatback 20 as shown in FIGS. 1 and 3, the front surface of this plate 60 comes to bear against the grid of steel wires 33 of the framework 30, so as to improve the stiffness of the rear surface of the seatback 20 which then approaches that obtained with seatbacks whose framework is provided with a metal sheet.

FIG. 4 shows a seatback 20' according to a second embodiment of the invention.

The seatback 20' is similar to the seatback 20 except that the means for holding the plate 60 against the back 52 of the cover 50 is different.

Here, the holding means is made up of a single pocket 55 of nonwoven textile completely enveloping the plate 60 and being sewn on the periphery of the inner surface of the back 52.

Even though this could have a consequence of slightly increasing the mass of the seatback 20, the use of such a pocket 55 covering the entirety of the plate 60 serves to avoid the generation of parasitic noises during vibratory micro-shocks occurring between this plate and the grid 33 of metal wires of the framework 30 during phases of driving of the vehicle.

According to variants not shown, the means for holding the stiffening plate against the inner surface of the back of the cover is again different.

According to other alternative embodiments. not shown, the frame of the framework of the seatback does not necessarily have a rectangular shape whereas the number and/or arrangement of metal wires of this framework can also be different.

Finally, it will be noted that the claimed invention is not limited to the embodiments described and shown, but that it encompasses any variant within the reach of the person skilled in the art.

The seatback can thus in particular be implemented over all known configurations of modifiable bench-seats with two or three independent seatbacks arranged side-by-side in the direction of the width of the vehicle (for example, ⅓-⅔, 40-20-40 or even 60-20-60 type).

The invention claimed is:

1. A motor vehicle rear bench-seat seatback pivotally mountable by pivoting connections to a structure of said vehicle and movable between a raised position and a substantially horizontal folded down position, wherein said seatback comprises a framework comprising a metal frame and a grid of metal wires extending between two risers and two cross pieces of said frame, and padding supported by a front part of said frame and a cover covering said frame, said padding being on an outside of said seatback;

wherein said seatback further comprises a stiffening plate held via holding means against the inner surface of the back of said cover and coming to rest against a rear part of said frame; said holding means comprising four triangular pockets sewn into four ends of the inner surface of the back of said cover and into which four corners of said stiffening plate are inserted.

2. The rear bench-seat seatback according to claim 1, wherein said pockets are made of a nonwoven textile.

3. The rear bench-seat seatback according to claim 1, wherein said stiffening plate is made of plastic, cardboard or wood-based composite material.

4. The rear bench-seat seatback according to claim 3, wherein said stiffening plate is made of a cellular plastic.

5. The rear bench-seat seatback according to claim 4, wherein said stiffening plate is made of a polypropylene based cellular plastic.

6. The rear bench-seat seatback according to claim 1, wherein said stiffening plate has a thickness of between 2.5 and 6 mm.

7. The rear bench-seat seatback according to claim 1, wherein ends of the metal wires making up said grid are welded on the rear surface of said frame, and wherein said stiffening plate comes to rest against said wires.

8. A motor vehicle rear bench-seat comprising at least two seatbacks conforming to claim 1; said seatback being arranged side-by-side in the direction of the width of said vehicle.

9. A motor vehicle rear bench-seat seatback pivotally mountable by pivoting connections to a structure of said vehicle and movable between a raised position and a substantially horizontal folded down position, wherein said seatback comprises a framework comprising a metal frame and a grid of metal wires extending between two risers and two cross pieces of said frame, and padding supported by a front part of said frame and a cover covering said frame, said padding being on an outside of said seatback;

wherein said seatback further comprises a stiffening plate held via holding means against the inner surface of the back of said cover and coming to rest against a rear part of said frame; said holding means comprising one single sewn pocket on the periphery of the inner surface of the back of said cover, said pocket completely covering said stiffening plate.

10. The rear bench-seat seatback according to claim 9, wherein said pocket is made of a nonwoven textile.

11. The rear bench-seat seatback according to claim 9, wherein said stiffening plate is made of plastic, cardboard or wood-based composite material.

12. The rear bench-seat seatback according to claim 11, wherein said stiffening plate is made of a cellular plastic.

13. The rear bench-seat seatback according to claim 12, wherein said stiffening plate is made of a polypropylene based cellular plastic.

14. The rear bench-seat seatback according to claim 9, wherein said stiffening plate has a thickness of between 2.5 and 6 mm.

15. The rear bench-seat seatback according to claim 9, wherein ends of the metal wires making up said grid are welded on the rear surface of said frame, and wherein said stiffening plate comes to rest against said wires.

16. A motor vehicle rear bench-seat comprising at least two seatbacks conforming to claim 9; said seatback being arranged side-by-side in the direction of the width of said vehicle.

* * * * *